United States Patent [19]

Hilbert et al.

[11] Patent Number: 4,944,549
[45] Date of Patent: Jul. 31, 1990

[54] SUN VISOR FOR MOTOR VEHICLES

[75] Inventors: Bernhard Hilbert, Cappel; Gerard Hilt, Henriville, both of France

[73] Assignee: Gebr. Happich GmbH, Fed. Rep. of Germany

[21] Appl. No.: 395,756

[22] Filed: Aug. 18, 1989

[30] Foreign Application Priority Data

Oct. 4, 1988 [DE] Fed. Rep. of Germany ....... 3833673

[51] Int. Cl.⁵ .............................................. B60J 3/02
[52] U.S. Cl. .................................... 296/97.9; 296/97.1
[58] Field of Search .................... 296/97.9, 97.12, 97.1, 296/97.13

[56] References Cited

U.S. PATENT DOCUMENTS

| 4,163,579 | 8/1979 | Mahler et al. | 296/97.1 |
| 4,668,005 | 5/1987 | Dietz | 296/97.9 |
| 4,734,955 | 4/1988 | Connor | 296/97.9 X |

FOREIGN PATENT DOCUMENTS

| 1259725 | 1/1968 | Fed. Rep. of Germany . |
| 2851485 | 5/1979 | Fed. Rep. of Germany . |
| 3008361 | 9/1981 | Fed. Rep. of Germany . |
| 3134400 | 4/1983 | Fed. Rep. of Germany . |
| 3307008 | 9/1983 | Fed. Rep. of Germany . |
| 3342897 | 6/1985 | Fed. Rep. of Germany . |

Primary Examiner—Dennis H. Pedder
Assistant Examiner—Gary C. Hoge
Attorney, Agent, or Firm—Ostrolenk, Faber, Gerb & Soffen

[57] ABSTRACT

A sun visor for a motor vehicle comprising a sun visor body developed as a cushioning body embedded in a covering formed from two precut sheets which are welded around the circumference to each other by high frequency welding. A stiffening reinforcement insert is disposed within the cushioning body. A swing mounting pin is formed on the reinforcing insert generally inward from the upper circumferential edge of the visor body. That pin has two diametrically opposite either axially extending flats or groove shaped depressions. The flat or depressions prevent a buildup of the weld beads produced upon the high frequency welding. There are at least two radially protruding, axially extending ribs defined on the mounting pin which penetrate into the covering material and prevent relative movement therebetween. The mounting shaft for the visor body extends into a mounting housing and the mounting shaft and the swing mounting pin are axially aligned.

13 Claims, 2 Drawing Sheets

SUN VISOR FOR MOTOR VEHICLES

BACKGROUND OF THE INVENTION

The present invention relates to a sun visor for motor vehicles having a cushioned sun visor body, which is embedded in a covering formed of two precut sheets that are heat sealed together circumferentially at their edges by high frequency welding. The body is stiffened by an incorporated reinforcement insert. The sun visor body has a swing mounting pin that is defined by the reinforcement insert and that is covered by the precut sheets.

A sun visor of this type is shown and described in Federal Republic of Germany AS No. 1,259,725. In that known sun visor, the swing mounting pin is formed from a free lying section of the inner support which is covered by the covering sheet. The swing mounting pin section of the support is reinforced in the region of the covered section by a sleeve which is covered by the covering sheet. The pin has laterally protruding wings for heat sealing to the sleeve. The sleeve is formed of two plastic sheets which are heat sealed together at their edges in the longitudinal central plane of the visor. For attachment of the plastic sheets to the swing mounting pin, a sleeve must consist of plastic material, which is capable of being heat sealed by high frequency and which therefore is inherently rather expensive. This is important particularly when the entire inner support together with the swing mounting pin is to consist of plastic, as proposed in Federal Republic of Germany AS No. 1,259,725. On the other hand, if the inner support comprises a wire frame, in accordance with Federal Republic of Germany AS No. 1,259,725, then it is necessary to roughen it by knurling in the region of the sleeve arranged thereon, and then to mount thereon a separately produced sleeve and to weld the precut sheets to it. Several process steps are necessary, which makes the manufacture difficult, delays it and increases the price of the sun visor.

Federal Republic of Germany AS No. 1,259,725 shows that the wings formed on the sleeve lie in the separating joint between the two sheet layers of the sleeve and thus in the plane of the welding electrodes. However, this does not assure a clean weld seam or a clean edge closure.

The swing mounting pin of a motor vehicle sun visor is a structural part which is subjected to high stresses. It not only functions as a swing mounting on the swinging up and down of the sun visor but, upon the swinging of the sun visor from the windshield to a side window, it is in each case constrained by the undercut mounting receiver of the outer support. In this connection, it must take up high clamping forces. There have been different proposals for arranging and shaping the swing mounting pin such that while it is as inexpensive to manufacture as possible, it cannot be easily damaged.

Thus, Federal Republic of Germany OS No. 2,851,485 describes a method of manufacturing a sun visor in which one of the longitudinal sides of a foam core is provided with a cutout, and an arm of stiff thermoplastic material, which passes through that cutout, and the sun visor core are wrapped with two soft thermoplastic sheets without cutout which can be connected together along the outer circumference of the foam core and loosely surround the arm in the region of the cutout. To permanently connect the clamping arm to the soft thermoplastic material of the cap elements without the soft thermoplastic material becoming detached from the arm after lengthy use, the arm, together with the two sections of the sheets resting on it, are clamped between two sonotrodes adapted to the shape. The sheets are then welded together to the arm by ultrasonics over the entire region of the arm. Although it appears conceivable that this method produces a permanent bond between the clamping arm and the thermoplastic covering, at least one additional operation and the provision of an additional manufacturing device are necessary for this. As a result, the cost of manufacture of the sun visor is increased.

Federal Republic of Germany OS No. 3,008,361 describes a sun visor for motor vehicles which has a swing mounting pin which is covered with precut sheets. In order to protect the covering of the swing mounting pin from damage, a sleeve surrounds the swing mounting pin and its covering. This cannot be satisfactory either, because manufacture of this sleeve and its necessary mounting result in additional operations and expenses.

The conditions are similar in the case of the sun visor known from Federal Republic of Germany OS No. 3,342,897 in which the swing mounting pin is formed, in whole or in part, from a plastic body which is extruded directly onto a region of the covering.

Federal Republic of Germany OS No. 3,134,400 (and also see Federal Republic of Germany OS No. 3,307,008) deal with the manufacturing problem of effecting the attachment of the swing mounting pin in the cushioning body so that its covering with the sheet like sleeve is not prevented by the swing mounting pin. The covering causes the cushioning body to be covered on each side with a sheet, and the two sheets are then welded together in a single operation along the edge of the sun visor body, following its contour.

The above publication indicates that the problem can be solved in two different ways. In one solution, the swing mounting pin is included in the sheet like covering, i.e. by also covering the swing mounting pin with the sheet. In the other solution, the swing mounting pin is fastened in a mounting body provided for this purpose only after the manufacture of the sheet like sleeve, it being guided by edge side openings in the sheet.

Federal Republic of Germany OS No. 3,134,400, which refers to the second solution with a free lying swing mounting pin, concerns a sun visor wherein the swing mounting pin, which is straight from end to end, has its end regions inserted through openings in the sleeve and in each case into a plug hole in one or the other arm of an approximately U-shaped holding yoke fastened within the sleeve in the sun visor body and it is secured in the one plug hole against rotation and in the other plug hole against axial displacement with respect to the holding yoke. In this known proposal, it is necessary to incorporate in the sun visor body a holding yoke which is separately manufactured and mounted. This makes the manufacture of the sun visor difficult and considerably more expensive. In particular, however, it is necessary to first introduce the swing mounting pin into the one plug hole which permits axial displacement, and only after the swing mounting pin has been introduced into it, to push the swing mounting pin back into the other plug hole, to effect the axial locking, possibly with the use of a snap effect. This type of mounting requires at least a considerable amount of dexterity and, viewed as a whole, appears extremely time consuming and work consuming.

As has been made clear by the prior art cited, solutions which are directed at not including the swing mounting pin of a sun visor within the sheet like covering do not represent useful alternatives, if only for reasons of expense. The present invention is therefore concerned with a sun visor in which the swing mounting pin is also to be covered with a sheet, as known from Federal Republic of Germany AS No. 1,259,725.

SUMMARY OF THE INVENTION

Starting from a sun visor described in and known from Federal Republic of Germany AS No. 1,259,725, the object of the present invention is to develop the swing mounting pin in such a manner that a constriction free, nonrotatable connection is effected between it and its surrounding covering.

This object is achieved with the invention wherein the swing mounting pin is developed either with two diametrically opposite, axially extending flats or with two groove shaped depressions, either of which means prevent application of the weld beads produced upon high frequency welding. Furthermore, the pin is provided with at least two radially protruding, axially extending ribs, which counteract relative movement between the covering and the swing mounting pins. The ribs have free edges which penetrate into the covering material.

With the invention, there is no weld connection between the swing mounting pin and the covering material, contrary to Federal Republic of Germany AS No. 1,259,725. For this reason, the swing mounting pin of the invention also does not have any wings which produce a relatively large lack of roundness. In particular, the material for the reinforcement insert and for the swing mounting pin can now be freely selected, since only stability requirements and not weldability need be taken into account. By the arrangement of flats or preferably of groove shaped depressions on the swing mounting pin, the rear weld beads of the covering do not cause any lack of roundness of the swing mounting pin but instead already contribute to holding the covering fixed against rotation on the swing mounting pin. This fixing of the covering on the swing mounting pin is supported or effected by the ribs which are arranged on the swing mounting pin, and the free edges of the ribs penetrate into the covering material. The ribs need have only a slight height of, for instance, at most 0.5 mm, in order to produce the desired effect. Their slight height assures that there is no damage to the covering material since their free edges dig only slightly into the rear or inside of the covering material. Viewed in a cross section through the mounting pin, the ribs can be developed in saw tooth manner or each is approximately in the manner of an isosceles triangle. Further, the free rib edge should not be developed as a sharp burr, but, in each case, it is slightly rounded. As has been shown by extensive experiments, the present invention assures that the covering surrounding the swing mounting pin cannot be twisted or torn upon actual use of the sun visor in which the outer support pin is engaged in the mounting receiver of an outer support housing and is swung therein. No bursting of the weld seams could be observed either.

It is advisable for simple, rational and inexpensive manufacture, that the swing mounting pin be developed in one piece with and be integral with the reinforcing insert consisting of the plastic extruded part.

Other objects and features of the invention are explained below with reference to the drawings.

DESCRIPTION OF A PREFERRED EMBODIMENT

The sun visor has a body 1 which is developed as a cushioning body of approximately rectangular surrounding contour and of flat shape. The sun visor body 1 is a foam body 2, which is possibly divided into several parts. A reinforcement insert 3 is incorporated in the body. A covering 4 which is formed of two precut sheets is disposed over the body.

Figure 1:
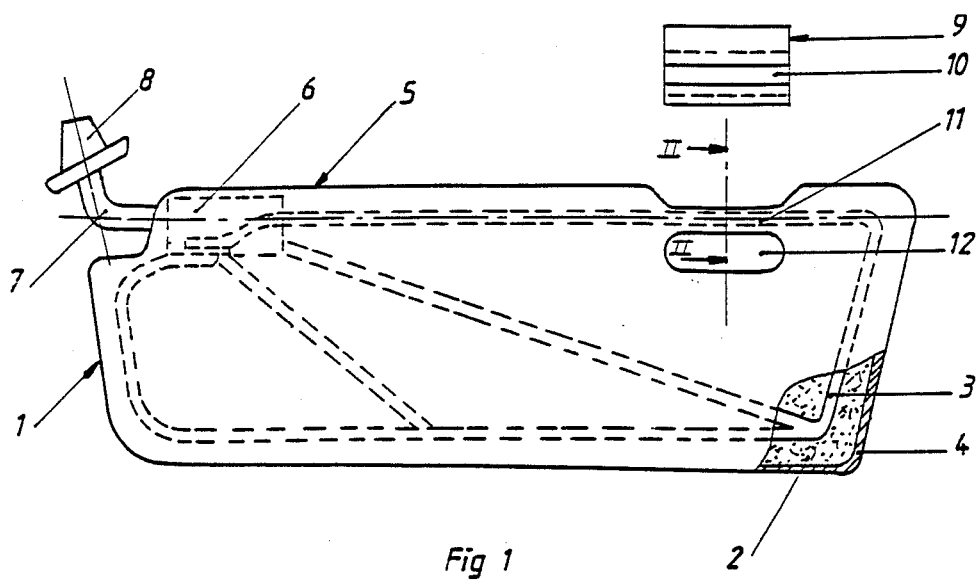
FIG. 1 is a front view of the sun visor.

In the region of the upper longitudinal edge 5 and to the left in FIG. 1, the sun visor body 1 has an incorporated mounting housing 6 which is preferably connected integrally with the reinforcement insert 3. The housing 6 is preferably developed as a plastic extrusion molding. In the mounting housing 6, there is mounted one arm of an approximately L-shaped mounting shaft 7. The other arm of shaft 7 is seated in a swing mount 8, which is adapted to be fastened to the body of a motor vehicle in conventional manner for vehicle visor bodies.

At the right in FIG. 1, an outer support is also arranged in the region of the upper longitudinal edge 5. The outer support comprises an outer support housing 9 which is adapted to be fastened to the body of the motor vehicle and a swing mounting pin 11 which is adapted to be detachably engaged in a mounting receiver 10 in the housing 9. The swing mounting pin 11 is aligned with the arm of the mounting shaft 7 that is present in the mounting housing 6 and forms a common axis of rotation with it.

The swing mounting pin 11, which passes through a cutout 12 in the sun visor body 1, is a part of the sun visor body 1 or, more accurately, an integral part of the reinforcement insert 3. The pin 11 is embedded in the covering 4 which is formed of two precut sheets.

Precut PVC sheets, in particular, are used as the material for the covering 4 of the sun visor body 1. The sheets are connected to each other by high frequency welding. The high frequency welding of plastics proceeds via the dielectric heating of nonconductive polar substances in a high frequency electrical field. This is a dependable and rapid method, which has the further advantage that the weld protrusion, insofar as electrodes combined with cutting edges are used, can be torn off along a residual film directly after the welding without the use of special tools, so that a clean and smooth welding seam remains. In practice, one precut sheet of the covering material is placed on the one main surface and the second precut sheet is placed on the other main surface of the sun visor body. Each precut sheet defines a circumferentially protruding flange in the central plane of the sun visor body. The flanges are then clamped between two arm electrodes which face each other and then are circumferentially welded to each other by high frequency welding such that an inward directed weld bead is formed by flow of material on the flange edges located toward the body. The weld protrusion is then removed by mere tearing. The sun visor body 1, including the swing mounting pin 11, has then been provided with a covering formed of two precut sheets.

Figure 2:
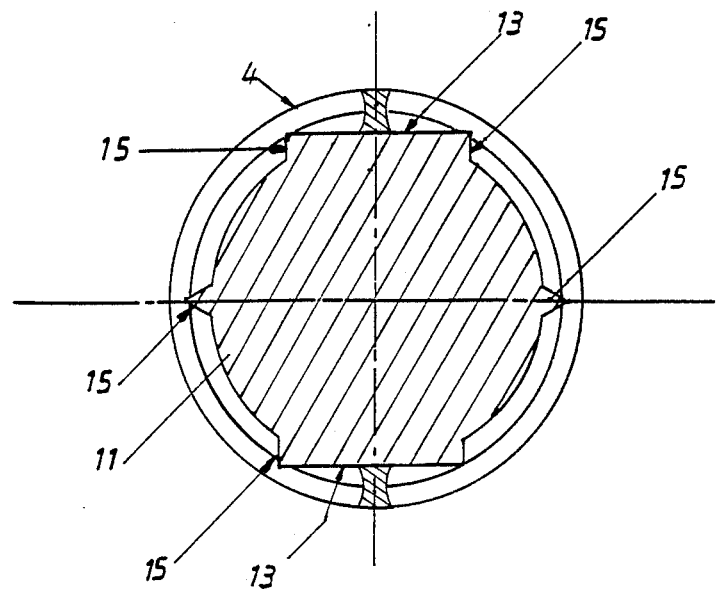
FIG. 2 is an enlarged section along the line II—II of FIG. 1.
Figure 3:
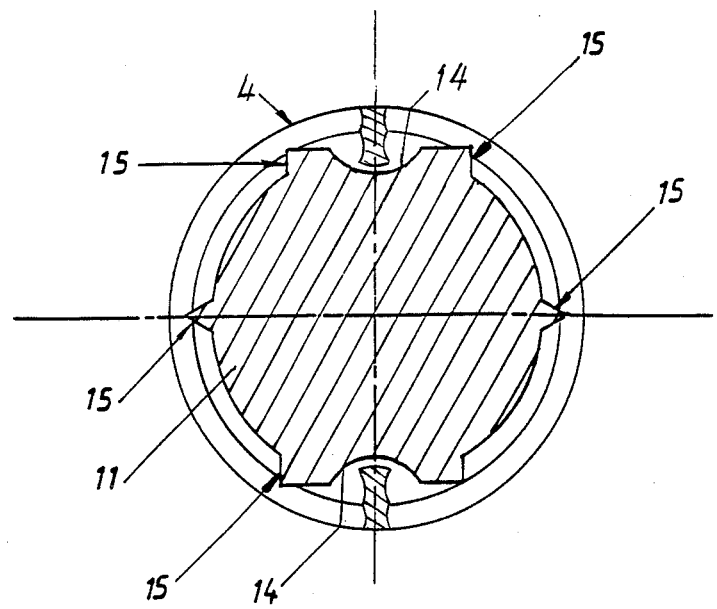
FIG. 3 is also an enlarged section along the line II—II of FIG. 1, but of an alternative embodiment.

The swing mounting pin 11 is shown in FIGS. 2 and 3 in cross section without the covering 4 and on a scale which is substantially larger than FIG. 1. The swing mounting pin 11 is provided on two diametrically opposite sides either with a flat surface 13 on each side (FIG. 2) or with a groove shaped depression 14 on each side (FIG. 3). The swing mounting pin 11 furthermore has, distributed over its circumference, a plurality of axial ribs 15 which protrude radially out of the outer surface of the swing mounting pin 11 and have free edges. Both the flats 13 and the groove like depressions 14 as well as the ribs 15 extend over the axial length of the swing mounting pin 11. The weld beads (not shown in further detail) rest against the flats 13 or preferably in the groove like depressions 14 and are adapted to orient themselves protected against displacement in the radial direction so that already in this way the covering 4 is prevented from turning on the swing mounting pin 11. Additional and very effective protection against twisting is obtained by the ribs 15. For this purpose, the ribs may be saw toothed in cross section across the pin 11, and particularly each may have the shape of an isosceles triangle.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A sun visor for a motor vehicle, said sun visor comprising:
   a cushioning body, a reinforcement insert for reinforcing said cushioning body and a cover for covering said cushioning body and said reinforcement insert;
   said reinforcement insert including a swing mounting pin, said swing mounting pin being located near an upper edge of said sun visor;
   said cover surrounding said swing mounting pin without being welded to said swing mounting pin, said cover including two sheets which are connected together by welds, said welds being formed by high frequency welding, said welds including a first elongated weld which extends along one side of said swing mounting pin and a second elongated weld which extends along another side of said swing mounting pin, said first elongated weld including an elongated bead which is directed inwardly toward said swing mounting pin;
   said swing mounting pin including first means for (a) receiving said elongated bead of said first elongated weld such that the outer surface of said cover has a generally smooth, circular cross section in the vicinity of said first elongated weld and (b) preventing relative movement between said cover and said swing mounting pin.

2. The sun visor of claim 1, wherein the means includes an axially extending flat surface.

3. The sun visor of claim 1, wherein the means includes an axially extending groove shaped depression.

4. The sun visor of claim 1, wherein said swing mounting pin includes a first elongated rib, said rib being located between said first and second welds, said rib penetrating slightly into said cover to prevent relative movement between said cover and said swing mounting pin.

5. The sun visor of claim 4, wherein said second weld includes an elongated bead which is directed inwardly toward said swing mounting pin, said swing mounting pin including second means for (a) receiving said bead of said second weld such that the outer surface of said cover has a generally smooth, circular cross section in the vicinity of said second weld and (b) preventing relative movement between said cover and said swing mounting pin.

6. The sun visor of claim 5, wherein said swing mounting pin includes a second elongated rib, said second rib being located between said first and second welds, said second rib penetrating slightly into said cover to prevent relative movement between said cover and said swing mounting pin.

7. The sun visor of claim 6, wherein each of said ribs is generally of saw toothed shape, viewed in a cross section through the swing mounting pin.

8. The sun visor of claim 6, wherein each of said ribs is shaped approximately as an isosceles triangle, viewed in cross section across the swing mounting pin.

9. The sun visor of claim 5, wherein the first and second means are on diametrically opposite sides of the swing mounting pin, said first and second means each including an axially extending flat surface.

10. The sun visor of claim 5, wherein the first and second means are on diametrically opposite sides of the swing mounting pin, said first and second means each including an axially extending groove shaped depression.

11. The sun visor of claim 1, wherein the swing mounting pin is integral with and one piece with the reinforcement insert.

12. The sun visor of claim 11, wherein the swing mounting pin and the reinforcement insert are comprised of a plastic part.

13. The sun visor of claim 1, further comprising a mounting housing along a circumferential edge of the sun visor, toward a corner of the sun visor and spaced away from the swing mounting pin; a mounting shaft extending into the mounting housing; the mounting housing and the shaft being so shaped and positioned and the swing mounting pin being so shaped that the swing mounting pin and the mounting shaft are generally axially aligned, for defining a swivel axis for the visor around the shaft and the swing mounting pin.

* * * * *